No. 788,261. PATENTED APR. 25, 1905.
C. IDLY.
RAKE.
APPLICATION FILED DEC. 20, 1904.
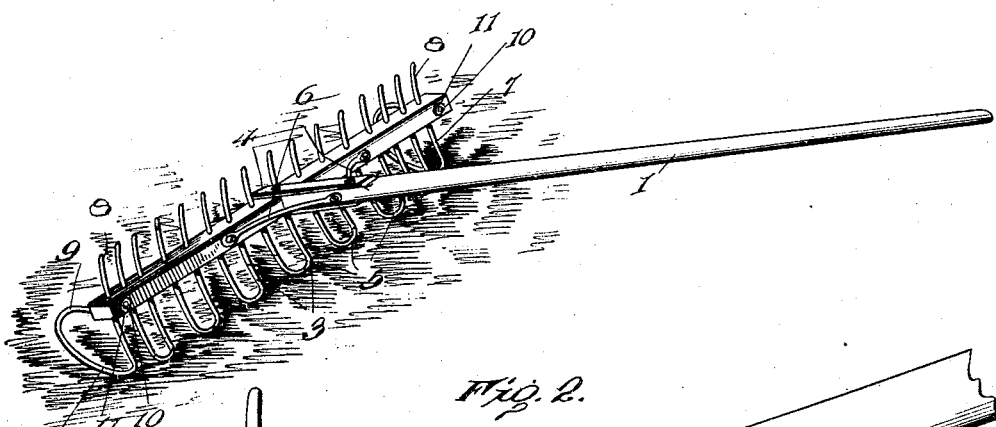
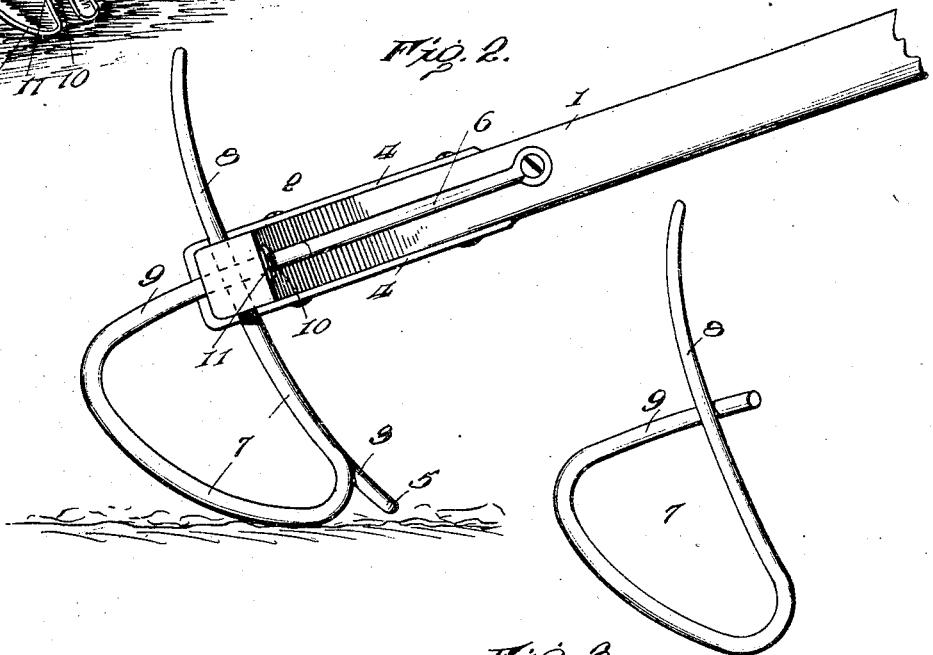
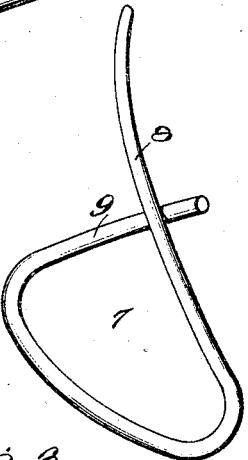
Witnesses
Inventor
Christian Idly.
By R. S. & A. B. Lacey, Attorneys No. 788,261. Patented April 25, 1905.

UNITED STATES PATENT OFFICE.

CHRISTIAN IDLY, OF OKLAHOMA, OKLAHOMA TERRITORY, ASSIGNOR TO J. PAUL IDLY, OF OKLAHOMA, OKLAHOMA TERRITORY.

RAKE.

SPECIFICATION forming part of Letters Patent No. 788,261, dated April 25, 1905.

Application filed December 20, 1904. Serial No. 237,717.

*To all whom it may concern:*

Be it known that I, CHRISTIAN IDLY, a citizen of the United States, residing at Oklahoma, in the county of Oklahoma, Oklahoma Territory, have invented certain new and useful Improvements in Rakes, of which the following is a specification.

This invention embodies improvements in lawn-rakes, and the object of the invention primarily is to provide means for preventing the teeth of a rake of this type from cutting or tearing up the soil of the lawn as the implement is being drawn thereover in the customary manner.

The improvements comprise, essentially, ground-supports for the rake-teeth, said supports preferably consisting of runners carried by the head of the rake to keep the teeth off of the ground, to prevent clogging of the teeth, and to generally lighten the work so that the implement may be operated with greater ease than incident to the common types of rakes at present in use.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of a lawn-rake having the invention applied thereto. Fig. 2 is a side elevation. Fig. 3 is a detail perspective view of one of the toothed supporting members which contacts with the ground in operating the rake.

Corresponding and like parts are referred to in the following description and indicated in all the views of the drawings by the same reference characters.

The construction of rake to which the invention is shown applied is that of a type at present in use, and the implement comprises the usual handle 1, provided at one end with a head 2 and having a plurality of teeth 3 mounted in the head. The head 2 is preferably secured to the handle 1 by means of a piece of strap-iron 4, and said head is preferably made from a transverse bar having a plurality of vertical openings through which the teeth 3 pass. The teeth 3 are preferably of curved formation, being made from a single length of material bent between its ends, as shown at 5, to form spaced toothed members. The construction of the teeth is non-essential within the contemplation of the invention, since any type of these members may be employed. Suitable braces 6 are provided for the head 2.

Upon the ends of the head 2 are mounted the ground supporting devices, and these members consist of runners 7, projecting downwardly from the head 2 and secured thereto in any substantial manner. The runners 7 are designed to rest upon the ground in order to hold the teeth 3 slightly off of the ground, and thereby prevent these teeth from catching in the soil and tearing or otherwise acting upon the same in a manner detrimental to the perfect keeping of the lawn. The runners 7 each consist of a shank 8, which passes through a vertical opening in the head 2, the shank being thence extended forwardly to form the runners or ground portion proper, after which the runner is extended rearwardly toward the handle 8 to form a horizontal brace portion 9, which is passed through a horizontal opening in the head 2 and secured to the last-mentioned part. The rear extremity of the portion 9 of the runner is preferably headed, as shown at 10, and a washer 11 may be interposed between the headed portion 10 and the head 2 of the implement for obvious purposes. The portions of the runner 7 which extend vertically and horizontally through the head 2 are almost in the same vertical plane, the above subserving the rigidity of the member 7.

It will be seen from the foregoing that a rake having the runners 7 located at the ends thereof or at intermediate points in the head 2 may be advantageously used, since the teeth are not likely to engage the soil and become clogged as they carry the grass or like material. The teeth being held a short distance above the surface of the soil will enable the operator to use the implement with greater ease, this being a desideratum in a device of this class. Further, it will be noted that the provision of the supporting devices 7 does not materially increase the cost of the implement for the reason that these parts are simple and cheaply constructed.

Having thus described the invention, what is claimed as new is—

In a rake, the combination of a handle, a head attached to said handle, a plurality of teeth secured to said head, and runners secured to the head, each runner consisting of a shank passing vertically through the head, said shank being extended forwardly to form a runner portion and thence bent rearwardly and passed horizontally through the head to form a brace portion, the rear extremity of the brace portion being headed to prevent displacement of the runner from the head.

In testimony whereof I affix my signature in presence of two witnesses.

CHRISTIAN IDLY. [L. S.]

Witnesses:
 WILLIAM H. ZWICK,
 JOHN W. HAYSON.